United States Patent
Savoca

[19]

[11] Patent Number: 5,903,007
[45] Date of Patent: May 11, 1999

[54] METHOD AND APPARATUS COMPENSATING FOR RADIANCE VARIATIONS IN HORIZON SENSING

[75] Inventor: Robert C. Savoca, Ridgefield, Conn.

[73] Assignee: EDO Corporation, Barnes Engineering Division, Shelton, Conn.

[21] Appl. No.: 08/901,317

[22] Filed: Jul. 28, 1997

[51] Int. Cl.$^6$ .................................. G01J 5/06
[52] U.S. Cl. ................ 250/342; 250/349; 244/171
[58] Field of Search ..................... 244/171; 250/349, 250/342

[56] References Cited

U.S. PATENT DOCUMENTS

| | | |
|---|---|---|
| 3,486,024 | 12/1969 | Astheimer . |
| 3,551,681 | 12/1970 | Astheimer . |
| 3,714,432 | 1/1973 | Jalink, Jr. ................................ 250/349 |
| 4,785,169 | 11/1988 | Gontin . |
| 5,079,419 | 1/1992 | Falbel . |
| 5,399,862 | 3/1995 | Savoca . |
| 5,477,052 | 12/1995 | Doctor ..................................... 250/349 |
| 5,744,801 | 4/1998 | Diedrickson ............................ 250/349 |

Primary Examiner—Constantine Hannaher
Assistant Examiner—Darren M. Jiron
Attorney, Agent, or Firm—Joseph Levinson; Mark P. Stone

[57] ABSTRACT

A multiple detector array is positioned in a satellite orbiting the earth for determining the attitude of the satellite with respect to the earth by detecting the earth's horizon. The multiple array of spaced detectors are mounted on a horizon sensor with a space detector viewing space, a horizon detector, with a field of view straddling the horizon and outer space space, a detector viewing the earth, and a gradient detector viewing the earth. Individual signals from these detectors are amplified and processed such that any gradients between the two earth viewing detectors are used to provide radiance compensation to correct for radiance errors in sensing the true position of the horizon.

3 Claims, 3 Drawing Sheets

METHOD AND APPARATUS COMPENSATING FOR RADIANCE VARIATIONS IN HORIZON SENSING

FIELD OF THE INVENTION

This invention relates to horizon sensors for determining the position of the earth's horizon, and more particularly for providing compensation and correcting errors in locating the true horizon due to earth radiation variations viewed by the sensor due to changes in the latitude, seasons, weather and the effect of thermal gradients within the horizon sensor per se.

BACKGROUND OF THE INVENTION

Horizon sensors are mounted in satellites, spacecraft and the like to provide attitude information (orientation) of the orbiting body with respect to the earth. A detector in the horizon sensor, usually an infrared detector, is scanned or oriented across the earth's horizon which is extremely warm when compared to cold outer space generating a signal representing a line of thermal discontinuity.

A major problem with horizon sensing arises from the large variations in earth radiance with latitude, season and weather. Even though the horizon profiles are most uniform in the 14–16 micron spectral region (carbon dioxide absorption band), the profiles still vary with latitude, season and weather. Significant longitudinal radiance variations also occur in the winter hemisphere due to storms, extra tropical cyclones, frontal systems, etc.

Several compensation techniques have been employed in an effort to remedy this problem, eg. a compensation detector viewing the earth in the vicinity of the sensing detector is provided in accordance with U.S. Pat. No. 3,486,024. However, this assumes that the radiation is uniform over both the "sensing" and "compensation" detectors which is not always the case. Since the horizon sensor is positioned above the earth and at altitudes ranging from 200 nautical miles to above geosynchronous 22,000 nautical miles, the latitudinal and longitudinal radiance variations over the sensing and compensating fields can produce substantial pitch and roll errors. These errors also occur at lower altitudes.

Additional pitch and roll errors can also result from thermal gradients in the horizon sensor per se, for example, temperature gradients in the detector mount, filter, filter mount, lens, etc.

SUMMARY OF THE INVENTION

Accordingly, it is an object of this invention to provide an improved method and apparatus for producing more accurate pitch and roll spacecraft attitude information by reducing the effects of earth radiance errors in horizon sensors.

Another object of this invention is to provide an improved horizon sensor which provides compensation for thermal gradients from the horizon sensor per se.

In carrying out this invention in one illustrative embodiment thereof, a horizon sensor for providing compensation for radiance variations of the earth due to changes in latitude and seasons and the effect of thermal gradients in the horizon sensor to reduce errors in determining the true position of the horizon includes an infrared detector means comprising an array of spaced infrared detector means positioned along an optical axis of the fields of view of the horizon sensor, having space detector means, horizon detector means, earth radiance detector means and gradient detector means. An optical head mounted on a satellite whose attitude is desired to be determined houses said array of spaced infrared detector means providing a field of view of the earth's horizon with said space detector means viewing outer space, said horizon detector means straddling the earth's horizon and said earth detector means and said gradient detector means viewing the earth. Means are provided for using any radiance gradient between the earth and gradient detector means for providing a correction factor to reduce horizon and detector means errors due to thermal gradients.

BRIEF DESCRIPTION OF THE DRAWINGS

The invention together with further objects, aspects, features, and advantages thereof, will be more fully understood by reference to the following description taken in connection with accompanying drawings.

DESCRIPTION OF THE PREFERRED EMBODIMENT

Figure 1:
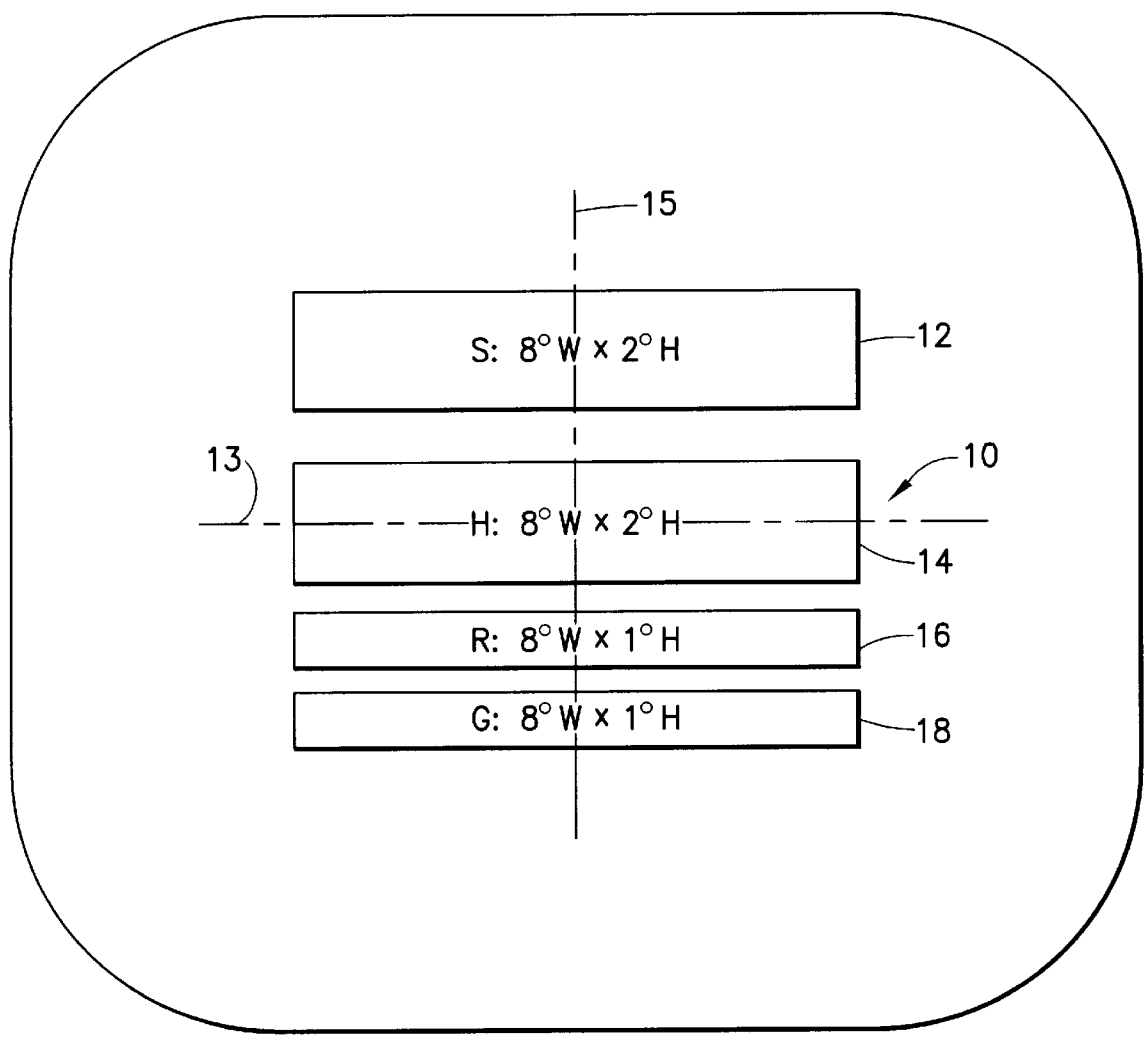
FIG. 1 is a plan view of one type of array of spaced infrared detectors used in the present invention, to provide the fields of view illustrated.

Referring now to FIG. 1 the detector 10 of the present invention comprises an array having four separate elements 12, 14, 16, and 18. These produce four fields of view along an optical axis 15 with detector 10 having a space field (S) from detector 12 viewing space; detector 14 with a horizon field (H) straddling the horizon which is the main measurement field; detector 16 with a radiance field (R) providing a measure of the earths radiance; and detector 18 providing a gradient field (G) which is used with the radiance field (R) to calculate the local radiance gradient which is used as a correction term. For ideal fields the following simple algorithm is used:

$$X = K_D \frac{H}{R}$$

where X is the uncorrected depression angle indicated at 13 on FIG. 1; $K_D$ is a constant; H and R represent outputs of corresponding fields, and the gradient is:

$$T = \frac{R}{G} - 1$$

where R represents the output of the R- field and G represents the output of the G field. Accordingly, the gradient corrected depression angle is given by:

$$X_{COR} = X \cdot (1 - K_R T)$$

where $K_R$ is a constant dependent on geometry and with zero gradient naturally yielding no change in horizon position.

Real-field algorithms will effect the gain and offset terms but will not substantially change radiance error correction.

Figure 2:
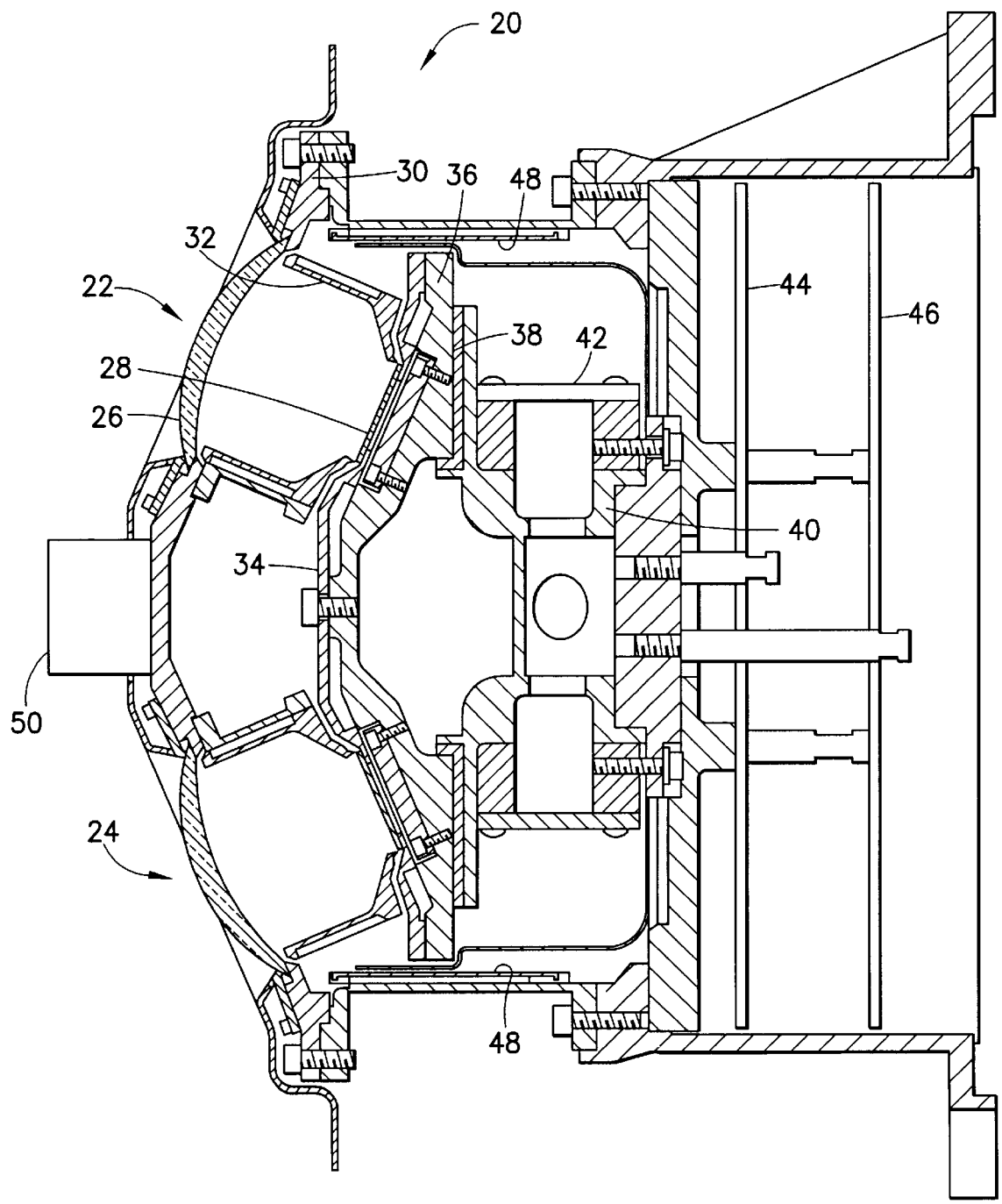
FIG. 2 illustrates one form of optical head which may be utilized in the present invention for projecting the fields of view in accordance with the invention.
Figure 3:
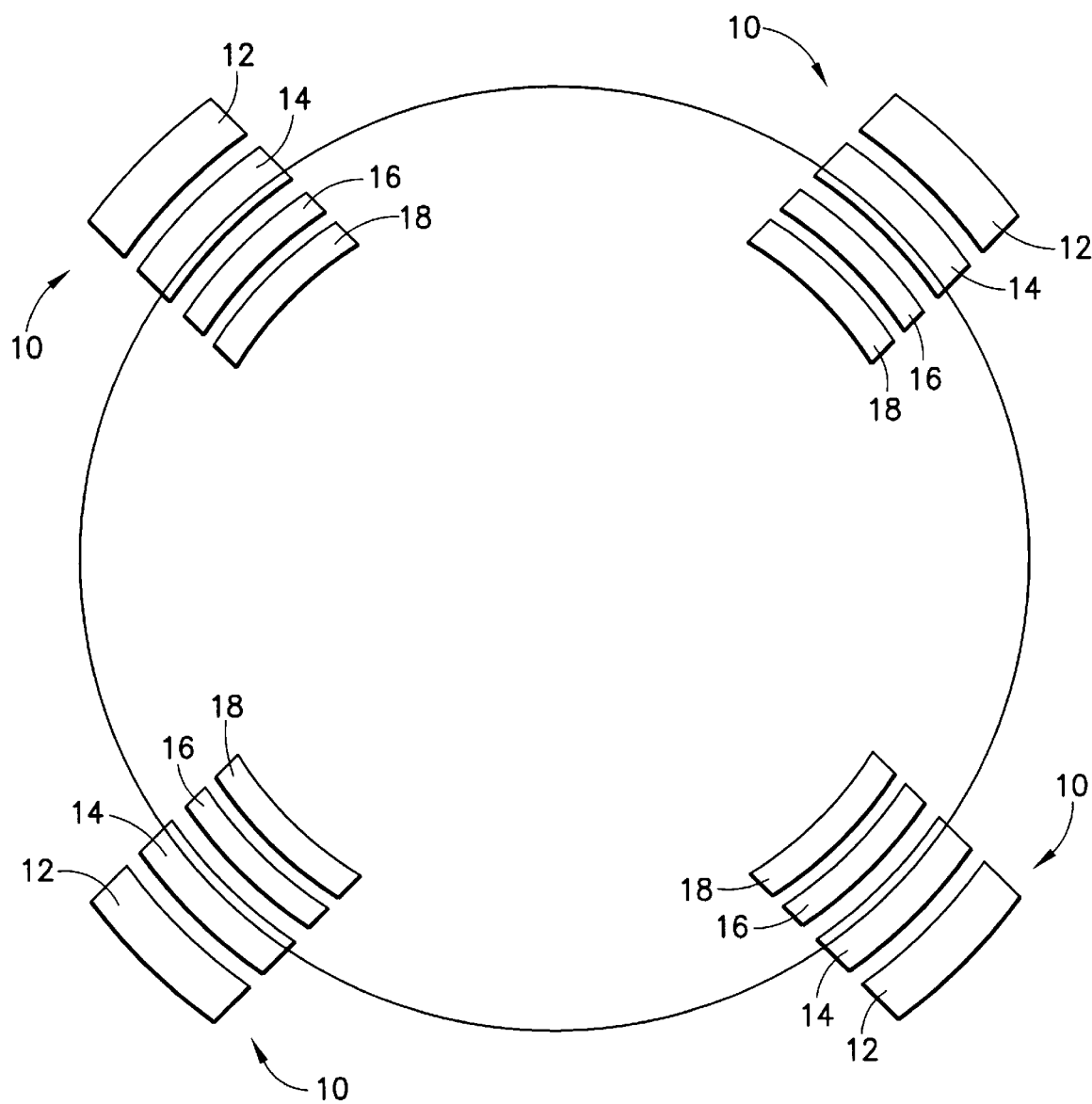
FIG. 3 illustrates the resulting projected fields of views of horizon sensors utilizing the earth of one embodiment utilizing one form of the new detector array in accordance with FIG. 2.

Referring now to FIGS. 2 and 3, an optical head 20 is mounted on a satellite whose attitude is to be monitored. The optical head 20 shown in FIG. 2 includes four telescope units 22 and 24 shown in cross-section and two additional telescopes (not shown) in a plane perpendicular to the plane shown in FIG. 2. The number of telescope units will generally depend on the orbit of the satellite. For example, a standard geosynchronous orbit of 22,000 nautical miles with a 17.5° earth could require a single telescope unit to project the four fields of view while four telescope units might be required to provide the resulting projected fields of view on a lower earth orbit. It should be pointed out that a single optical head is not essential, and it is to be understood that where multiple telescope units are required, they may be mounted and spaced individually around the satellite to provide the desired projected fields of view on the earth's horizon.

The optical head in FIG. 2 shows two of four telecope units required to provide the fields of view shown for the 45.09° earth illustrated in FIG. 3. Since the telescope units are the same whether one or more are used only a telescope unit 22 will be described in detail along with portions of the optical head 20 in which unit 22 is mounted.

Telescope unit 22 includes a lens 26, a filter 28, and a detector array 10 which may be any type of infrared detector array which is responsive to the radiation passed by the filter 28. For example, a thermocouple array arranged in alignment on the same optical axis 15 to provide the field of view 12, 14, 16, and 18 as shown on FIG. 1 may be used. However, any type of infrared detector array providing the same or similar fields of view may be used, for example, thermistor detectors or pyroelectric detectors may be used in combination with a chopper in order to produce a signal.

The filter 28 is preferably a 14–16 micron germanium filter to pass radiation in the carbon dioxide band but any other suitable band such as the water vapor band may be used. The lens 28 is mounted in a lens support 30 which covers an optical barrel 32 which is grooved and blacked and also forms an aperture stop. The filter 28 is held in a filter mount 34 which is positioned over the detector array 10 positioned on a detector mounting 36. A detector mount isolator 38 which is positioned on a pedestal support 40 holds the detector mounting 36. Computer electronics 42 as well as preamplifier boards 44 and 46 are also mounted in the unit 22 to process individual signals fed separately to the computer electronics 42 and preamplifies 44 and 46 in accordance with the algorithms discussed. The optical head 20 also includes internal thermal radiation shields 48 and an integral alignment reference cube 50.

The lens 26 may be a germanium objective lens with 80% solar reflection or any other infrared transmissive lens at the wavelengths desired to be measured by the detectors means 10.

In accordance with the present invention, the field as shown in FIG. 1 collect radiant energy from the earth with the detector 10 fields 12, 14, and 16 providing signal outputs proportional to the areas subtended by the fields of view which are positive compared with cold space. Since field 14 straddles the horizon 13 and the R field is completely filled by the earth, the dip-in, the angular distance from the edge of the HE field to the horizon 13, is ideally given by $$X = H_A \frac{H}{R}$$

where X is the dip-in, $H_A$ is the angular height of the R field (radiance field) and H and R are outputs from the corresponding fields (above the zero of space).

Ideal pitch and roll are then computed by taking linear combinations of the dip-ins from four fields with appropriate gain factors. The following equations are the two field pitches and rolls computed by taking differences of adjacent fields as follows:

$$P_{1-2}=K_P(X_1-X_2)$$

$$P_{3-4}=K_P(X_3-X_4)$$

$$R_{3-1}=K_R(X_3-X_1)$$

and $$R_{4-2}=K_R(X_4-X_2)$$

Four-field pitch and roll are found by taking the averages of the two pairs of two-field pitches and rolls as follows:

$$P_4 = \frac{(P_{1-2} + P_{3-4})}{2}$$

and $$R_4 = \frac{(R_{3-1} + R_{4-2})}{2}$$

If thermal crosstalk between detector fields exists, that is, signal are output from one field due to power falling on another field, then gain and offset modification of the ideal dip-in formula results as follows:

$$X = K_D \frac{H^1}{R^1} + C_O$$

(with $K_D$ generally greater than $H_A$, and $C_O$ as an offset term). Also note that the outputs of the other fields are compared with the S-field used as a reference field, that is:

$$R'=R-k_{SH}S,$$

and $$H'=B-k_{SR}S$$

where $k_{SR}$ and $k_{SH}$ are fundamentally area-responsivity scale factors relating the fields to S.

The dip-in is corrected for radiance gradient effects by estimating the gradient, $\Gamma$, by comparing the outputs of the R and G fields, both immersed on the earth:

$$\Gamma = K_{RG} \frac{R' - k_{HR}H'}{G' - k_{HG}H'} + C_C$$

with the constants chosen to give zero gradient for a uniform earth. $k_{HR}$ and $k_{HG}$ are factors to account for thermal crosstalk from the H detector into R and G, respectively.

The gradient is then used to correct the basic dip-in calculation:

$$X_C=X\cdot(1-K_G\Gamma)$$

with zero gradient naturally yielding no change in the dip-in.

Accordingly, the extra gradient detector 18 provides two detector fields of view looking at the earth where the difference signal provides a measurement of the earth's radiance gradient which can be used to correct errors from such gradients. The second detector provides a second order correction. If the gradients are linear such linearity determines how good a correction may be obtained. Errors caused by the detector looking at the inside of the telescope will be the same for both the radiance detector 16 as well as the gradient detector 18 so instrument errors will also be corrected.

This principle is not limited to the field configuration as illustrated in FIG. 1 but can be used with different field configurations such as the double triangle as described in U.S. Pat. No. 4,785,169 or No. 3,551,681, as long as the radiance is measured along the optical axis of the projected fields of view of its detectors. The principle of using an additional detector to view the earth to provide a second order correction differs from previous methods e.g. as described in the foresaid patents which provide for measurements of absolute radiance or uniform radiance over the field to provide a correction whereas the present method which measures a radiance gradient which is used to provide any correction can be applied to either a scanning or static type horizon sensors. The principle is also applicable to a sensor in which a complete orbit profile is stored and then compared with subsequent orbit profiles to provide corrections.

Since other modifications and changes varied to fit particular operating requirements and environments will be apparent to those skilled in the art, the invention is not considered limited to the examples chosen for purposes of disclosure and covers all modifications and changes which do not constitute departures from the true spirit and scope of this invention.

What is claimed is:

1. A horizon sensor which provides compensation for radiance variations of the earth due to changes in the latitude, longitude, seasons, and weather and the effect of thermal gradients within the horizon sensor to reduce errors in determining the true position of the horizon comprising:

an infrared detector means comprising an array of spaced infrared detector means including space detector means, horizon detector means, earth radiance detector means and gradient detector means in optical alignment;

an optical head mounted on a satellite whose attitude is desired to be determined houses said array of spaced infrared detector means providing a field of view of the earth's horizon for said array of spaced infrared detector means with said space detector means viewing outer space, said horizon detector means straddling the earth's horizon, said earth detector radiance means and said gradient detector means viewing the earth; and means using any radiance gradient between said earth radiance detector means and said gradient detector means for providing a second order correction factor to reduce radiance errors in determining the true position of the horizon.

2. The method of correcting errors in pitch and roll measurements, by a horizon sensor viewing the ear in an orbiting satellite or spacecraft, due to radiance variations and gradients caused by changes in latitude, longitude, seasons, and weather comprising the steps of:

viewing the earth's horizon with infrared horizon detector means which straddles the earth's horizon for determining the position of the horizon;

viewing the outer space with space infrared detector means;

viewing the earth with earth infrared detector means;

viewing the earth with gradient infrared detector means for deriving a measurement of a thermal gradient between said earth infrared detector means when the earth radiance viewed by said gradient infrared detector means varies from said earth infrared detector means;

using the derived thermal gradient to provide a second order correction of the position of the horizon determined by the horizon sensor.

3. The method as set forth in claim 2 including the step of determining said thermal gradient in accordance with $$T = \frac{R}{G} - 1$$

where R represents the earth radiance measurement by said infrared detector means and G represents the output of said gradient earth infrared detector means.

* * * * *